United States Patent [19]

Mendonca, Jr.

[11] Patent Number: 4,853,163

[45] Date of Patent: Aug. 1, 1989

[54] METHOD OF CONTROLLING DISCHARGE OF STORED ELECTRIC CHARGE IN PLASTIC OBJECTS AND FORMING LICHTENBERG FIGURES IN PLASTIC OBJECTS

[75] Inventor: Jose M. Mendonca, Jr., Salem, N.H.

[73] Assignee: United States of America as represented by the Secretary of the Air Force, Washington, D.C.

[21] Appl. No.: 158,447

[22] Filed: Feb. 22, 1988

[51] Int. Cl.$^4$ ............................................... B29C 71/00
[52] U.S. Cl. ......................................... 264/22; 264/25; 264/40.1; 264/78; 264/101; 264/162; 264/340; 264/341; 428/13
[58] Field of Search ..................... 264/22, 25, 26, 78, 264/101, 162, 340, 341, 345, 40.1; 428/13

[56] References Cited

U.S. PATENT DOCUMENTS

| | | | |
|---|---|---|---|
| 2,647,464 | 8/1953 | Ebert | 264/22 X |
| 4,092,518 | 5/1978 | Merard | 264/25 X |
| 4,113,595 | 9/1978 | Hagiwara et al. | 427/44 |
| 4,116,784 | 9/1978 | Hosoi et al. | 522/109 |
| 4,134,812 | 1/1979 | Sasaki et al. | 264/25 |
| 4,168,973 | 9/1979 | Simm et al. | 430/47 |
| 4,197,331 | 4/1980 | Gundlach et al. | 430/126 |
| 4,316,783 | 2/1982 | Hosoi et al. | 522/78 |
| 4,582,656 | 4/1986 | Hoffmann | 264/22 |

OTHER PUBLICATIONS

B. Gross, "Irradiation Effects in Plexiglass," *Journal of Polymer Science*, vol. 27, 1958, pp. 135–143.
D. M. Robinson, "*Dielectric Phenomena In High Voltage Cables,*" vol. 3, Aberdeen: Adeordeen University Press, 1936, pp. 5, 155.
Junichiro Furuta et al., "Discharge Figures in Dielectrics by Electron Irradiation", Journal of Applied Physics, vol. 37, No. 4, 15 Mar. 1966, pp. 1873–1878.
Bernhard Gross, "High Potentials in Electron-Irradiated Dielectrics", Journal of Applied Physics, vol. 38, No. 5, Apr. 1967, pp. 2272–2275.
H. Lackner et al., "Production of Large Electric Fields in Dielectrics by Electron Injection", Journal of Applied Physics, vol. 26, No. 6, Jun. 1965, pp. 2064–2065.
D. M. Robinson, "Dielectric Phen. In HV. Cables", Chapman and Hall, London, 1936.

*Primary Examiner*—Jeffery Thurlow
*Assistant Examiner*—Leo B. Tentoni
*Attorney, Agent, or Firm*—Stanton E. Collier; Donald J. Singer

[57] ABSTRACT

A method of preventing the spontaneous discharge of charged dielectric objects such that the surface of the objects are polished smooth to remove down to microscopic surface faults thereon. A maximum charge is storable therein having only loss by corona leakage from edges of the object. This method allows for a controlled discharge to create Lichtenberg figures therein. Artistic objects are also made by a method of coloration of the figure in the objects.

6 Claims, 2 Drawing Sheets

METHOD OF CONTROLLING DISCHARGE OF STORED ELECTRIC CHARGE IN PLASTIC OBJECTS AND FORMING LICHTENBERG FIGURES IN PLASTIC OBJECTS

STATEMENT OF GOVERNMENT INTEREST

The invention described herein may be manufactured and used by or for the Government for governmental purposes without the payment of royalty thereon.

BACKGROUND OF THE INVENTION

The present invention relates generally to the storage of electrical charge in objects, and, more particularly, to controlling the discharge of such objects.

The formation of Lichtenberg figures in such objects is well documented. These figures occur when an accumulated electric charge therein breaks down and discharges along the tree-link structure that occurs as a result of the breakdown. The breakdown may be caused intentionally by a needle prick, for example, or spontaneously through defects such as pits, cracks, scratches, etc. the size of which may hardly be noticeable.

In a dielectric material, the injected charge, whether injected intentionally or not, accumulates without rapid loss. In situations where radiation is present such as in hot rooms with viewing windows, these windows may spontaneously discharge causing color changes and patterns therein. These window materials may be glass or plastic.

Attempts to reduce these problems have been made. One effort, for example, is the modification chemically of the material to reduce the degree of discharge or reduce the level at which it occurs since all materials, even dielectric, eventually lose the stored charge by leakage to the atmosphere.

This problem has motivated a search for alternative techniques to reduce the spontaneous breakdown of dielectric materials.

SUMMARY OF THE INVENTION

The present invention is directed at a method of eliminating the spontaneous discharge of objects which are irradiated by electrical charges and is further directed at a method of creating, in clear plastic blocks of various shapes artistic objects.

A beam of electrons is aimed at a target block of clear plastic material. The plastic block being of any desirable shape and thickness is polished smooth to remove dents, scratches, mars, etc. to the point of being almost invisible to the eye. The surface has a glass-like appearance. Edges on the block are left perpendicular or otherwise and require no special treatment. For example, an 8 inch by 8 inch by one inch thick block is irradiated with a 4 centimeter diameter beam from a linear accelerator having a beam energy range of 6 million electron volts (Mev) to 12 Mev. The beam current is about 0.300 amperes and a pulse width of 4 microseconds per second. The number of pulses input is typically 700 to 1800. Therefore, each pulse carries about 12 microcoulombs ($\mu C$) of charge into the target. The upper bound on irradiating the blocks is not limited by spontaneous breakdown with the present invention but is limited by physical/chemical changes in the target. For example, discoloration and boiling limit the charge input. The amount of charge input just before this occurs is the maximum charge.

Therefore, with the present invention, almost no spontaneous breakdowns occur in the blocks - no matter the level of irradiation.

After the sample is irradiated, a needle prick, for example, is placed at any desired point to initiate forming the Lichtenberg figures therein. Additional figures may be placed in the sample by heating appropriately the block before irradiation.

The Lichtenberg figures themselves may be colored by dye. For example, a vacuum is placed on the sample to withdraw air within the figure channels. Thereafter, a dye solution is input which then flows into the figure channels. Further, the block may be colored in itself.

For example, a conically shaped block having a light green color is discharged at the base. A red dye is then input into the Lichtenberg figure. The resulting block looks like a colored tree therein. The artistic uses of this method are limited only by one's imagination.

Therefore, one object of the present invention is to provide a method of preventing spontaneous discharge in dielectric blocks of materials that are highly charged.

Another object of the present invention is to provide a method of producing charged blocks ready for controlled discharge without spontaneous discharge.

Another object of the present invention is to provide a method of creating artistic objects in blocks of clear plastic.

These and many other objects and advantages of the present invention will be readily apparent to one skilled in the pertinent art from the following detailed description of a preferred embodiment of the invention and the related drawings.

DETAILED DESCRIPTION OR THE PREFERRED EMBODIMENT

Electric charge may be stored in a plastic dielectric material subjected to bombardment by high-energy electrons. This stored charge may discharge suddenly and rapidly, either spontaneously or by a triggering event. When it does, a permanent pattern, called a Lichtenberg pattern (figure) or tree is permanently formed in the plastic. This pattern may be used for analysis to understand the conditions under which charging and discharging dielectrics form. These phenomena are responsible for altering critical mechanical, electrical, and optical properties of insulating materials in key spacecraft components. Discharges are also a source of radio-frequency noise, which can interfere with communication and they can initiate the detonation of explosives.

These permanent patterns in clear material are also valued works of art.

Previously, spontaneous discharge limited the size of plastic blocks and the amount of stored charge therein, and the locations of the discharge was not always predictable as a result. The previous method of preparation of the plastic material consisted merely of cutting and sanding, and the sample sizes were on the order or $4'' \times 4'' \times 1''$ blocks. The discharge, if it had not occurred spontaneously, was initiated by indenting the surface with a needle punch.

As noted in the prior art, the spontaneous discharge of charged dielectric materials is a significant problem. The presence of Lichtenberg figures may or may not be desired. For example, in electronic circuits with dielectric material therein such as plastic laminates a discharge could set up a short circuit path. In space applications this may be of critical importance. In contrast Lichtenberg figures appropriately placed in clear blocks of plastic of a desired shape have clear artistic value.

In the past, Lichtenberg figures could be placed in blocks of clear plastic but the needle prick had to be initiated, hopefully, before a spontaneous discharge, an unpredictable event. Thus the figures in many cases ended up in the wrong place and wasted the material.

This invention insures that there is an almost 100 percent success rate in preventing spontaneous discharging in the charged blocks. An additional benefit arises from the fact that this method also allows for maximum irradiation of the block before discharge thus increasing the size of the Lichtenberg figure in the block. This clearly benefits the artistic valve since larger blocks can be used without waste and larger Lichtenberg figures can be placed therein since spontaneous discharge does not occur.

The key point of this method is the removal from the block by polishing, of whatever shape, pits, dents, scratches, and other microscopic surface faults whereby by the surface has a glass-like appearance.

Figure 1:
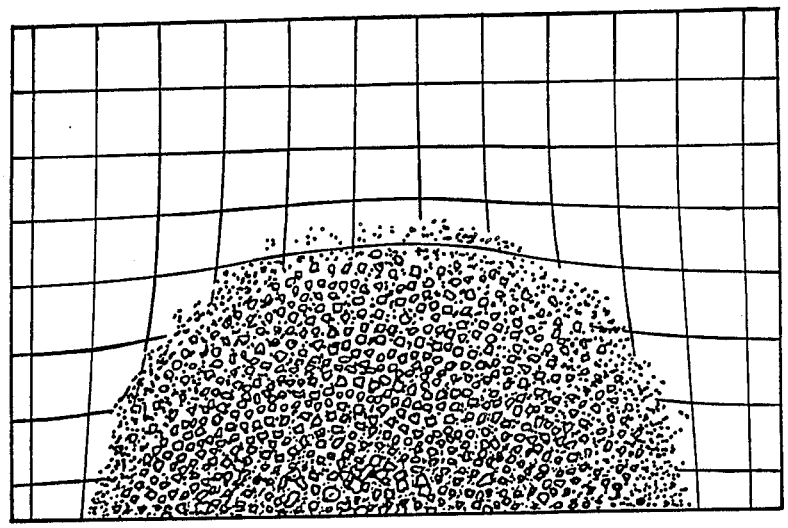
FIG. 1 is a partial view of the boiling within a clear plastic block that occurred after a high dose of electrons.

The edges are not critical. This method prevents spontaneous discharge wherein the block can be irradiated to the point of boiling, see FIG. 1, or discoloration. This upper limit being the maximum input charge is empirically determined for each shape of block. This method allows control of the point of discharge and produces "Radiation Art" objects in a reliable and controllable manner.

The block can be made of lucite, plexiglass, polymethylmethacrylate (PMMA), etc. The material must be a dielectric and further should be clear if used for artistic uses. The size of the blocks tested have been up to 24 inches by 24 inches by 1¼ inches thick. This method is not limited to a block size. The electron beam diameter is about 4 centimeters and has an energy range from 5 Mev to about 12 Mev. Previous examples from the prior art noted an input charge of up to 250 microcoulombs ($\mu$C) or an input charge density of about 5 $\mu$C./cm$^2$ before breakdown. In the present invention a beam having a 300 milliampere current, with a pulse width of 4 microseconds and diameter of 4 centimeters is pulsed from 700 to 1800 times to charge the sample. This beam is inputting 12 $\mu$C per pulse.

If the sample is polished properly as noted above, the sample under electron bombardment will not discharge spontaneously at the above amount; what occurs is that the sample heats up from bombardment, charge starts to leak off into the surrounding air and the sample bubbles and disfigures loosing the electrons.

Figure 2:
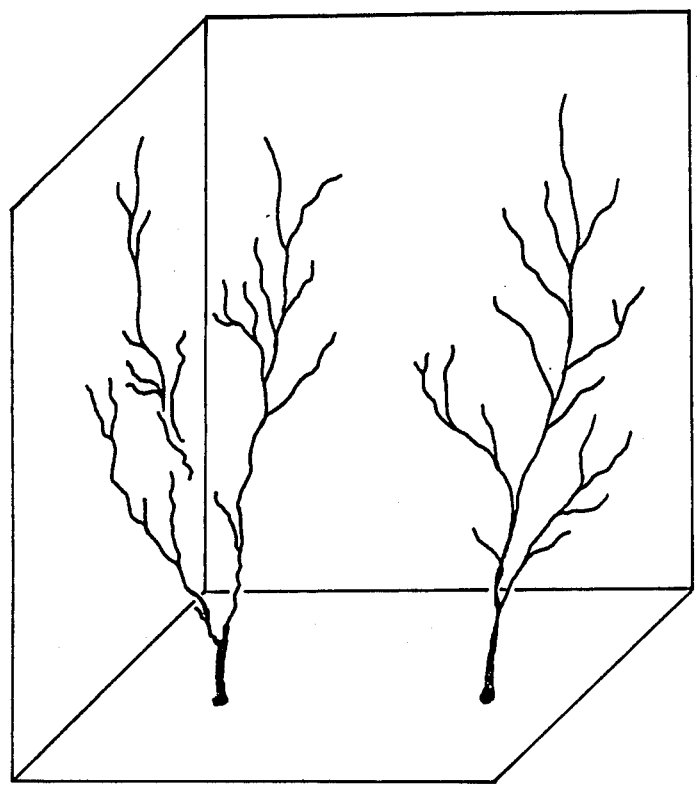
FIG. 2 illustrates a block with multiple Lichtenberg figures.

This method even allows for multiple Lichtenberg figures where the previously discharged block is heated to the point of softening the material, allowing it to cool, recharging the block and then pricking it again in a desired location. See FIG. 2. For example, the block is heated at 190° C. for approximately 1 to 2 hours.

Figure 3:
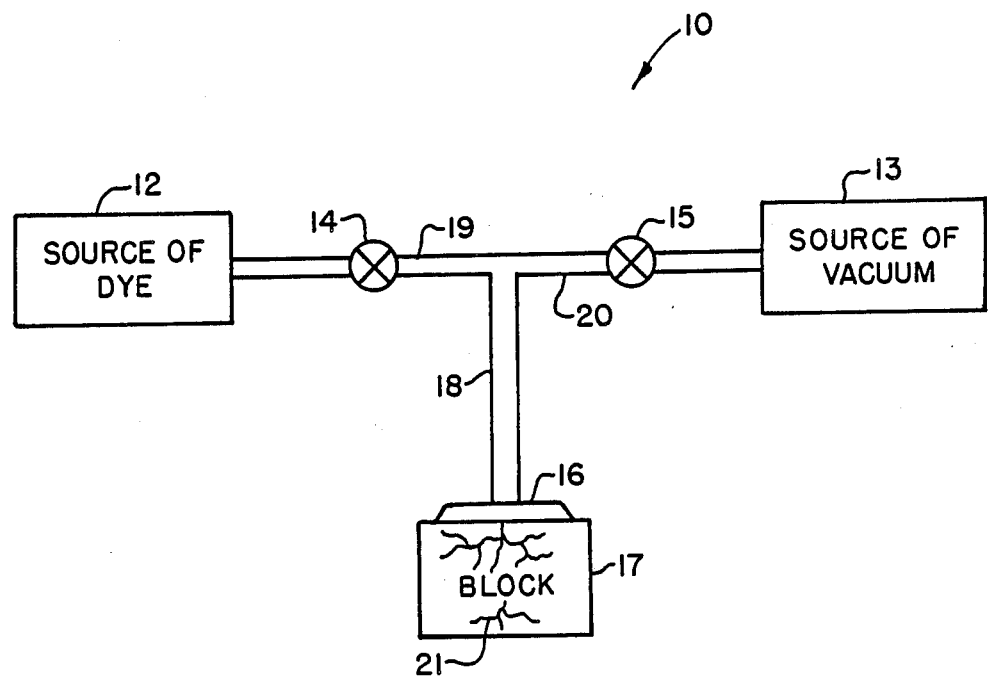
FIG. 3 illustrates the apparatus to dye the objects having Lichtenberg figures therein.

This invention also provides for coloring of the "trees" formed by the Lichtenberg figure for purposes of artistic display. This can be accomplished by an apparatus 10 as shown in FIG. 3. A suction plate 16 is attached to block 17 having Lichtenberg FIG. 21 therein. Suction plate 16 is attached to line 18 which is branch connected to a vacuum line 20 and a dye line 19. Line 19 has a valve 14 therein and line 20 has a valve 15 therein. A source of dye 12 is connected to dye line 19. A source of vacuum 13 is attached to vacuum line 20. The dye material may be added to heptane.

In operation, valve 15 is opened and valve 14 closed and the vacuum applied to block 17. After a sufficient vacuum, valve 15 is closed and valve 14 opened to allow the dye to be sucked into FIG. 21. If there are multiple trees each could be colored differently.

This invention provides for a more controllable discharge without any spontaneous discharge. It permits greater charge storage, larger samples and multiple discharges producing a highly valued work of art at a limited cost.

Clearly, many modifications and variations of the present invention are possible in light of the above teachings and it is therefore understood, that within the inventive scope of the inventive concept, the invention may be practiced otherwise than specifically claimed.

What is claimed is:

1. A method of preventing Lichtenberg figures by the spontaneous discharge of charged object, said method comprising the steps of:
    a. forming an object of a preselected shape of a dielectric material; and
    b. removing surface faults on said object to a microscopic size whereby the surface has a glass-like appearance.

2. A method of providing an object with multiple Lichtenberg figures therein, said method comprising the steps of:
    a. forming an object of a preselected shape of a dielectric material;
    b. removing surface faults on said object to a microscopic size whereby the surface has a glass-like appearance;
    c. determining a maximum input charge before damage occurs;
    d. inputting said charge into said object; and
    e. initiating the discharge of said object by pricking a surface of said object at a desired location.
    f. heating said object for a predetermined time; and
    g. repeating steps "a" to "f" for each new figure.

3. A method of coloring Lichtenberg figures within a clear object, said method comprising the steps of:
    a. applying a vacuum means over an initiation point being a exit point upon discharge;
    b. holding a vacuum on said initiation point;
    c. selecting a dye color;
    d. allowing a dying means to flow into said initiation point;
    e. disconnecting said object from said vacuum means and said dye means;
    f. repeating steps "a" to "f" for each initiation point as necessary.

4. A method as defined in claim 1 wherein said object is a clear material.

5. A method as defined in claim 2 wherein said object is a clear material.

6. A method as defined in claim 2 wherein said heating is to about 190° C. for about 1 to 2 hours.

* * * * *

UNITED STATES PATENT AND TRADEMARK OFFICE
CERTIFICATE OF CORRECTION

PATENT NO. : 4,853,163

DATED : August 1, 1989

INVENTOR(S) : Jose M. Mendonca, Jr.

It is certified that error appears in the above-identified patent and that said Letters Patent is hereby corrected as shown below:

```
In column 1, line 20, delete "link" and insert -- like -- therein.
In column 1, line 47, insert --,-- after "shapes".
In column 2, line 68, replace each "--->" with --"--.
In column 3, line 31, delete "by" after "whereby".

In claim 2, line 11, delete "and".
In claim 2, line 13, delete "." at end and insert --;-- therein.
In claim 3, line 10, insert -- and -- after ";".
```

Signed and Sealed this

Twenty-first Day of August, 1990

*Attest:*

HARRY F. MANBECK, JR.

*Attesting Officer*  *Commissioner of Patents and Trademarks*